(12) United States Patent
Tesson et al.

(10) Patent No.: US 12,258,879 B2
(45) Date of Patent: Mar. 25, 2025

(54) ASSEMBLY FOR A TURBOMACHINE

(71) Applicant: SAFRAN CERAMICS, Le Haillan (FR)

(72) Inventors: Thierry Guy Xavier Tesson, Moissy-Cramayel (FR); Thomas Revel, Moissy-Cramayel (FR); Christophe Paul Aupetit, Moissy-Cramayel (FR); Denis Jean Armel Busquet, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 12 days.

(21) Appl. No.: 18/266,761

(22) PCT Filed: Nov. 25, 2021

(86) PCT No.: PCT/FR2021/052096
§ 371 (c)(1),
(2) Date: Jun. 12, 2023

(87) PCT Pub. No.: WO2022/129723
PCT Pub. Date: Jun. 23, 2022

(65) Prior Publication Data
US 2024/0052759 A1    Feb. 15, 2024

(30) Foreign Application Priority Data

Dec. 15, 2020 (FR) ........................................ 2013280
Apr. 1, 2021 (FR) ........................................ 2103417

(51) Int. Cl.
*F01D 25/24* (2006.01)
*F01D 25/28* (2006.01)

(52) U.S. Cl.
CPC ........... *F01D 25/243* (2013.01); *F01D 25/28* (2013.01); *F05D 2260/31* (2013.01); *F05D 2300/6033* (2013.01)

(58) Field of Classification Search
CPC ...... F01D 25/24; F01D 25/243; F01D 25/246; F16B 5/02; F16B 5/0241; F16B 5/0258; F16B 19/02; F16B 43/00
(Continued)

(56) References Cited

U.S. PATENT DOCUMENTS 4,834,569 A * 5/1989 Foote .................... F16B 5/0241
                                                     403/30
5,848,874 A * 12/1998 Heumann ............. F01D 25/246
                                                     411/24
(Continued)

FOREIGN PATENT DOCUMENTS

FR     3038942 A1    1/2017
FR     3044701 A1    6/2017

OTHER PUBLICATIONS

International Patent Application No. PCT/FR2021/052096 English translation of International Search Report dated Feb. 28, 2022, 2 pages.

*Primary Examiner* — David E Sosnowski
*Assistant Examiner* — Maxime M Adjagbe
(74) *Attorney, Agent, or Firm* — Cozen O'Connor

(57) ABSTRACT

An assembly for a turbomachine includes at least a first part and a second part, and at least one bolt including a screw engaging with a nut. The screw extends through respective openings in the first part and in the second part. The bolt includes a support member having an annular collar mounted between the screw or the nut, and the first part. The collar has a support surface abutting, at least partially, on a complementary support surface of the first part. The collar (Continued)

also includes a recessed annular groove extending at the inner periphery of the collar.

14 Claims, 6 Drawing Sheets

(58) Field of Classification Search
USPC .......................................................... 411/544
See application file for complete search history.

(56) References Cited

U.S. PATENT DOCUMENTS

| | | | |
|---|---|---|---|
| 2014/0356094 A1* | 12/2014 | Revel | F16B 5/0241 411/82.5 |
| 2015/0219140 A1* | 8/2015 | Jenning | F16B 33/008 29/458 |
| 2017/0268546 A1* | 9/2017 | Stilin | F16B 43/00 |

* cited by examiner

ASSEMBLY FOR A TURBOMACHINE

CROSS-REFERENCE TO RELATED APPLICATIONS

This application is a US National phase Application of International Patent Application No. PCT/FR2021/052096 filed Nov. 25, 2021, which claims priority to FR No. 2103417 filed Apr. 1, 2021 and FR No. 2013280 filed Dec. 15, 2020, titled "Turbine Engine Assembly" all of which are hereby incorporated in their entireties.

TECHNICAL FIELD OF THE INVENTION

The invention relates to an assembly for a turbine engine, such as for example an aircraft turbojet or turboprop engine.

PRIOR ART

One of the main objectives in the design of a turbine engine, in particular in the aeronautical field, is mass reduction. Such a mass reduction has an effect on fuel consumption in particular.

In such a context, it is considered to replace many parts of the turbine engine conventionally made of a metallic material with parts made of a ceramic matrix composite (C.M.C) material. Such a material has different mechanical properties, in particular a low resistance to tearing, matting or holding under a screw head or a washer for example.

The invention falls within this context and aims to enable a bolted assembly of two parts, at least one amongst the parts may be made of a ceramic composite matrix material, for example. Of course, the invention is also applicable to other materials having some degraded mechanical characteristics compared to the conventionally used metallic materials.

Presentation of the Invention

To this end, the invention relates to an assembly for a turbine engine, said assembly including at least a first part and a second part, and at least one bolt including a screw cooperating with a nut, said screw extending throughout an orifice of the first part and an orifice of the second part, the bolt further including a bearing member comprising an annular flange mounted between the screw or the nut, on the one hand, and the first part, on the other hand, said flange including a bearing surface bearing, at least partially, on a complementary bearing surface of the first part, characterized in that said bearing surface of the flange is frustoconical and forms an angle with the complementary bearing surface of the first part so that only an outer peripheral area of said bearing surface of the flange comes into contact with the complementary bearing surface of the first part, in an untightened state of the bolt, said flange being deformable so that, when tightening said nut on the screw, a larger area of the bearing surface of the flange bears on the complementary bearing surface of the first part, said bearing member including a recessed annular groove extending at the inner periphery of the flange.

Such a structure allows effectively distributing the mechanical stresses on the flange when tightening the bolt. Indeed, during such tightening, the deformation of the flange allows making bearing of said flange on the first part even. This feature also allows increasing the bearing surface of the flange on the first part.

Moreover, the annular groove allows increasing the deformation capacitance of the flange and ensures a better distribution of the mechanical stresses during the deformation.

The groove may include a section at least one portion of which has a circle portion shape. Said section is viewed according to a plane extending according to the axis of the flange.

The radius of the portion shaped as a circle portion may be comprised between 0.2 and 1.4 mm for example.

The flange may bear on the first part, either directly or indirectly, for example via a washer.

For example, the thickness of the washer is comprised between 0.1 and 0.5 mm, for example in the range of 0.2 mm.

In the untightened state of the bolt, the angle between the bearing surface of the flange with respect to the complementary bearing surface of the first part may be comprised between 0.1 and 6°.

In the tightened state of the bolt, this angle may be zero so that the entire bearing surface of the flange bears on the complementary bearing surface of the first part.

The flange may be tapered in the direction of its outer periphery, so as to better distribute the mechanical stresses within the flange.

The flange may include a first surface directed on the side of a first end of the bearing member and an opposite second surface, forming the bearing surface intended to bear on the first part and directed on the side of a second end of the bearing member.

The first surface may, at least partially, be inclined by an angle P with respect to a plane perpendicular to the axis of the flange. Said angle P may be comprised between 5 and 30°.

The thickness of the flange at its outer periphery may be comprised between 0.6 and 1.5 mm.

The thickness is the dimension of the flange along the axis of the flange.

The distance, according to the axis of the flange, between the inner periphery of the first surface and the outer periphery of the second surface, may be comprised between 1 and 5 mm.

The first part may be made of a ceramic matrix composite material.

The second part may be made of a metallic material, for example of a nickel-based superalloy, for example Inco625, Inco718, or Waspaloy (registered trademarks).

The assembly may include a spacer mounted between the second part and a portion of the bolt, said spacer being made of a material having a greater coefficient of expansion than that of the screw.

Such a feature allows holding clamping of the two parts together despite any differential expansion effects.

For example, the screw is made of a material of the Inconel 718 or Waspaloy type. For example, the spacer is made of an A286-type material.

The surface of the end of the spacer bearing on the second part may be comprised between 0.1 and 3 times the surface of the flange.

The end of the spacer bearing on the second part may be accommodated, at least partially, in a counterbore of the second part.

The nut may be formed by the corresponding end of the spacer.

The assembly may include a bushing, said bushing comprising a cylindrical portion surrounding the screw and accommodated at least partially in the orifices of the first and second parts, said flange being formed by the bushing and extending from one end of the cylindrical portion.

In this case, the bushing may be held by a head of the screw. Said head of the screw may be frustoconical and bear on an inner chamfer of the bushing.

The cylindrical portion of the bushing may be accommodated, at least partially, in a recess of the spacer.

The flange may be formed at one end of the screw.

The spacer may include one end bearing on the second part and one end bearing on the nut or on a portion of the screw.

Bearing of the spacer on the second part may be a direct or indirect bearing, for example via a washer.

The flange may be accommodated, at least partially, in a counterbore of the first part.

The spacer may be centered on a portion of the screw or on the cylindrical portion of the bushing.

The invention also relates to a turbine engine, characterized in that it includes an assembly of the aforementioned type.

The turbine engine may be an aircraft turbojet or turboprop engine.

The invention also relates to an aircraft, for example an airplane, including a turbine engine of the aforementioned type.

DETAILED DESCRIPTION OF THE INVENTION

Figure 1:
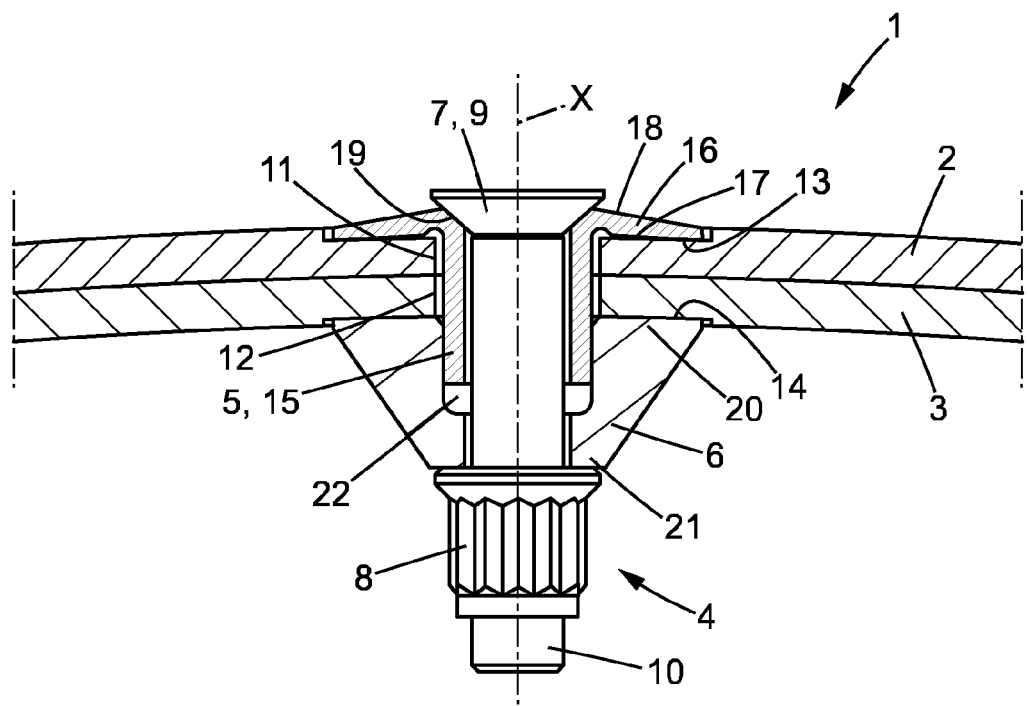
FIG. 1 is a sectional view of an assembly according to an embodiment of the invention.
Figure 2:
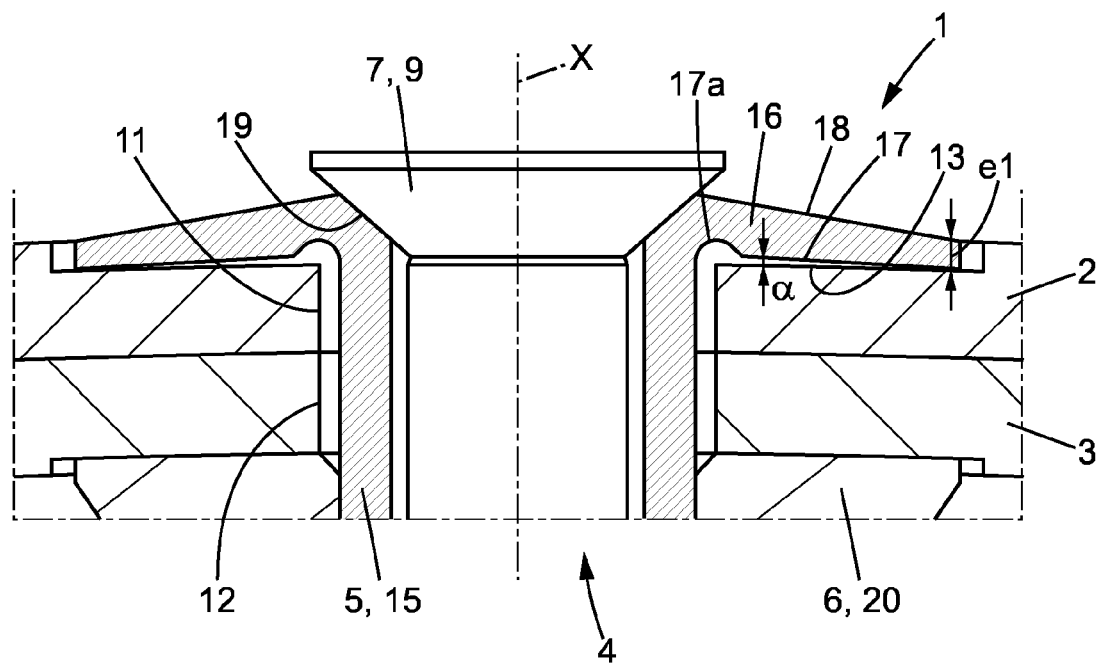
FIG. 2 is a detail view of FIG. 1.

FIGS. 1 to 5 illustrate an assembly 1 for an aircraft turbine engine according to a first embodiment of the invention. The assembly 1 includes a first part 2 made of a ceramic matrix composite material, a second metal part 3, a bolt 4, a bushing 5 and a spacer 6.

The assembled parts 2, 3 are formed by coaxial walls that are cylindrical or shaped as cylinder portions. The bolt 4 includes a screw 7 and a nut 8. The screw 7 includes a first end including a conical head 9 and a second tapped end 10 onto which the nut 8 is screwed. The screw 7 passes through orifices 11, 12 of the first part 2 and of the second part 3. A counterbore 13 is formed around the orifice 11 of the first part 2. A counterbore 14 is also formed around the orifice 12 of the second part 3.

The bushing 5 includes a cylindrical portion 15 surrounding the screw 7 and fitted into the orifices 11, 12. One end of the cylindrical portion 15 is extended by an annular flange 16 with a frustoconical general shape.

In particular, the flange 16 includes a frustoconical bearing surface 17 facing a complementary bearing surface 13 of the first part 2. Said complementary bearing surface is formed by the bottom surface of the counterbore 13 of the first part 2, the flange 16 being partially accommodated in said counterbore 13.

The bearing surface 17 of the flange 16 forms an angle α (FIGS. 2 and 3) with the complementary bearing surface 13 of the first part 2 so that only an outer peripheral area of said bearing surface 17 of the flange 16 comes into contact with the complementary bearing surface 13 of the first part 2, in an untightened state of the bolt 4. Moreover, the flange 16 is deformable so that, when said nut 8 is tightened on the screw 7, a larger area of the bearing surface 17 of the flange 16 bears on the complementary bearing surface 13 of the first part 2.

Figure 3:
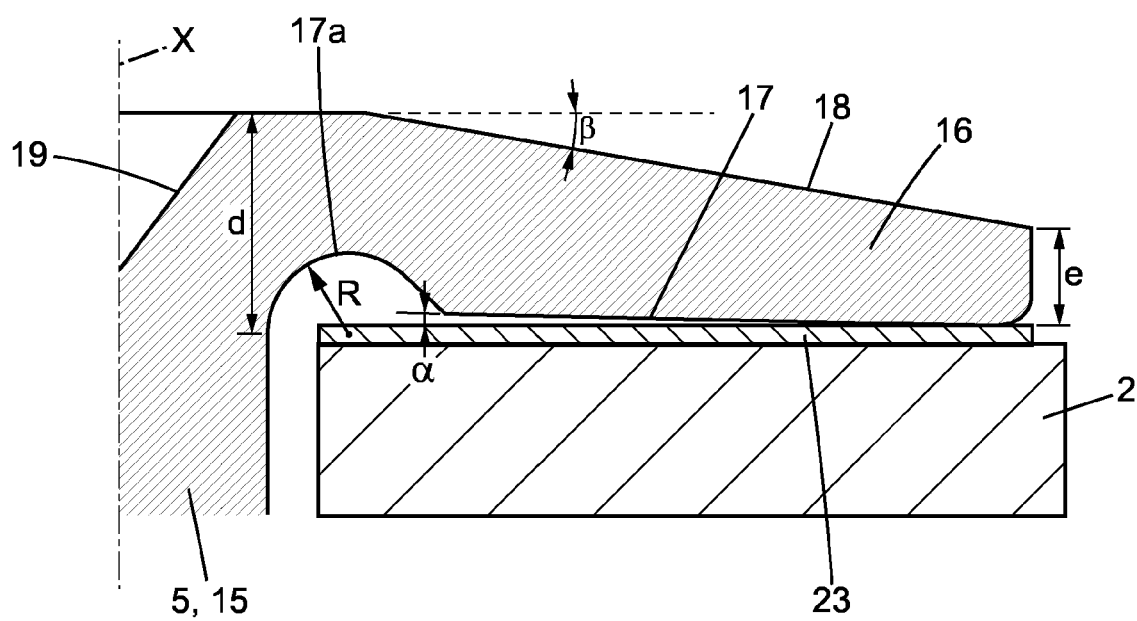
FIG. 3 is a detail view of FIGS. 1 and 2.
Figure 4:
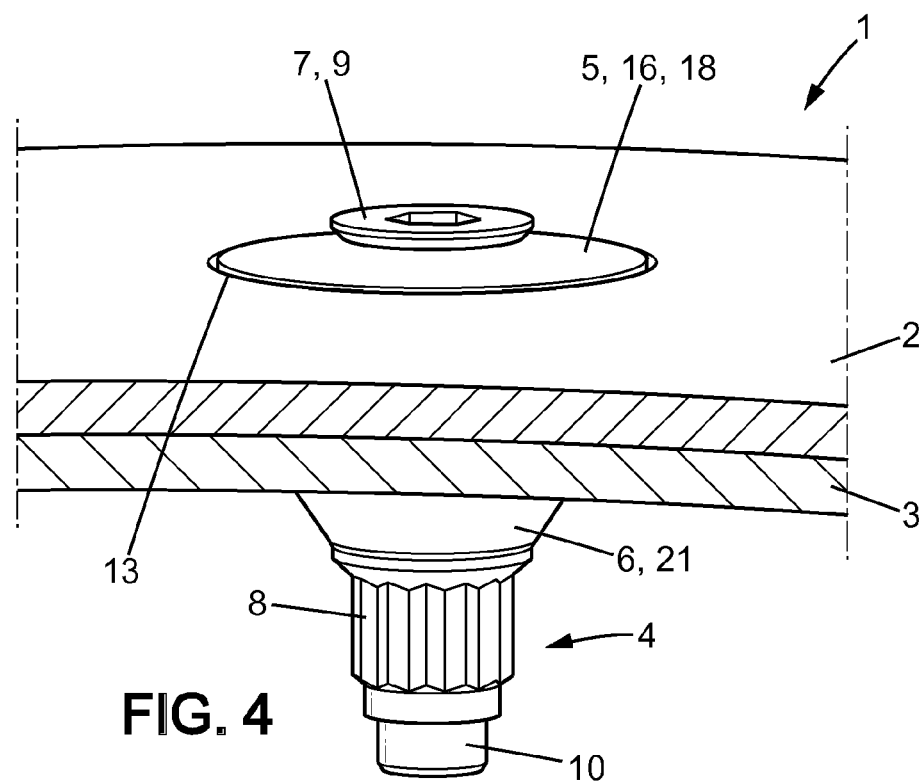
FIG. 4 is a perspective view of the assembly of FIG. 1.
Figure 5:
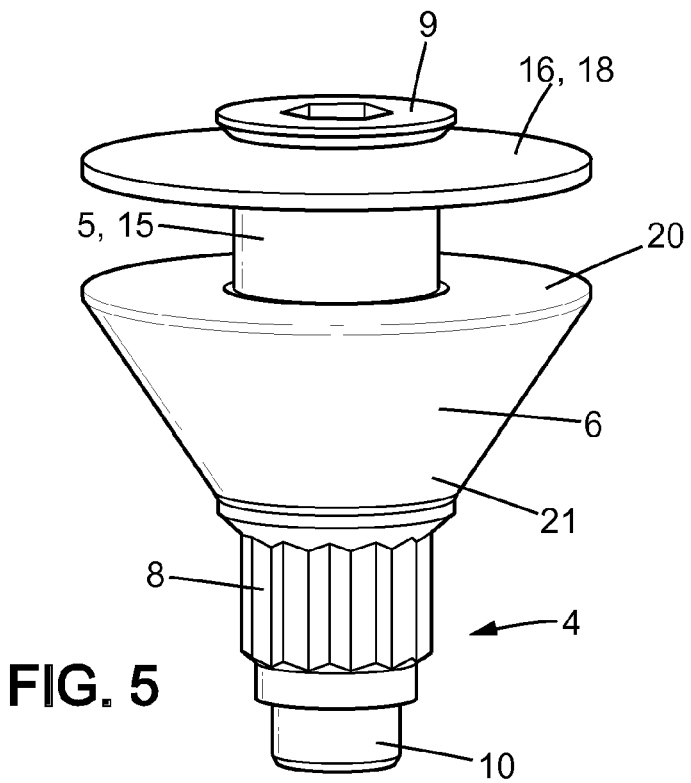
FIG. 5 is a perspective view of the assembly of FIG. 1, wherein the first and second parts have been removed.
Figure 6:
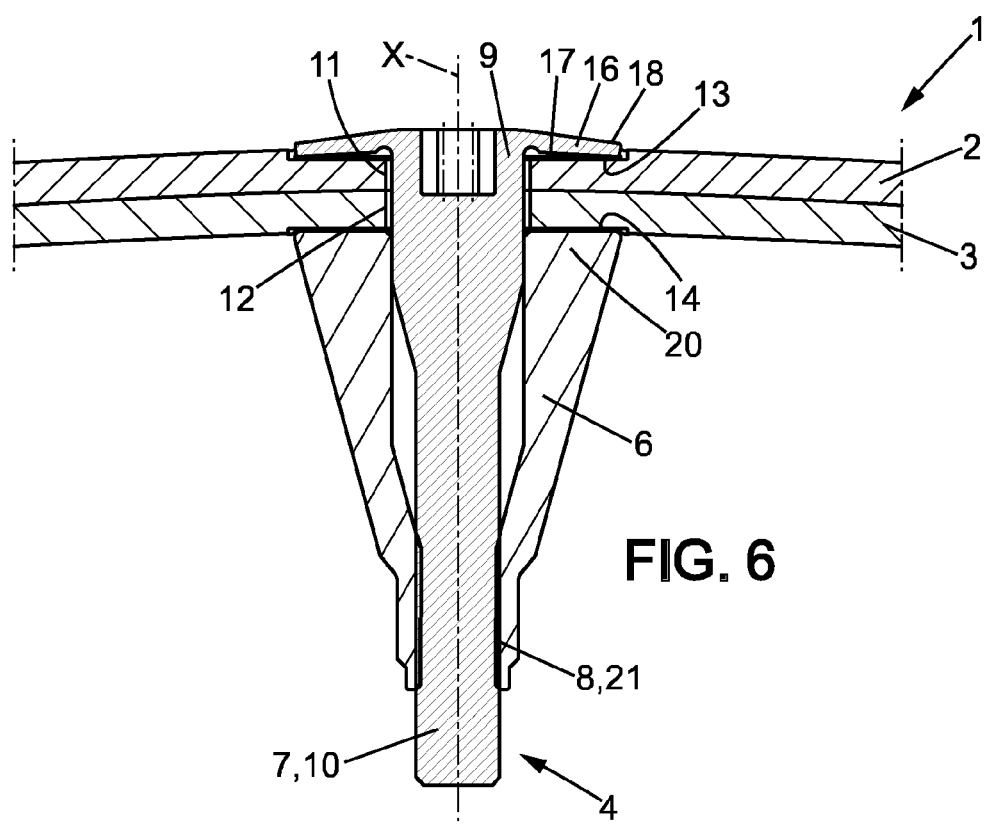
FIG. 6 is a sectional view of an assembly according to another embodiment of the invention.
Figure 7:
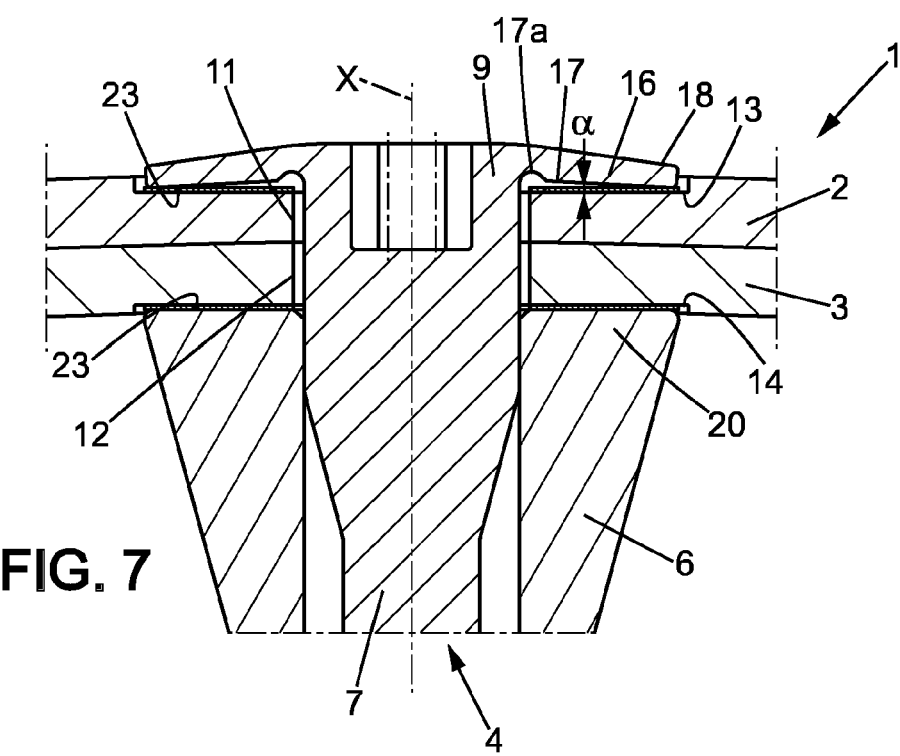
FIG. 7 is a detail view of FIG. 6.
Figure 8:
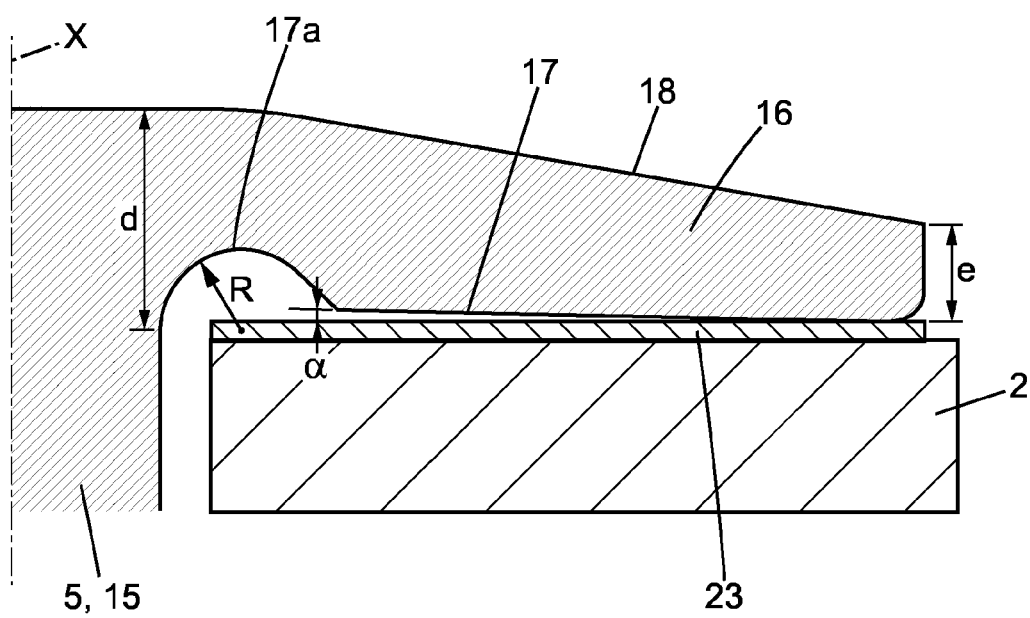
FIG. 8 is a detail view of FIGS. 6 and 7.
Figure 9:
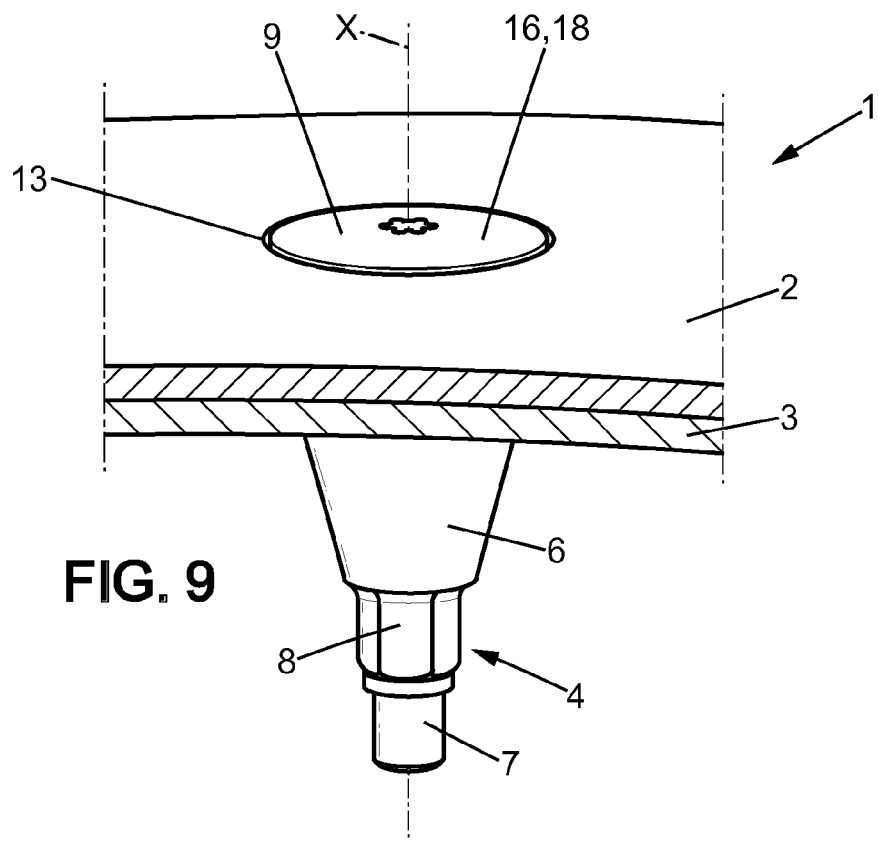
FIG. 9 is a perspective view of the assembly of FIG. 6.
Figure 10:
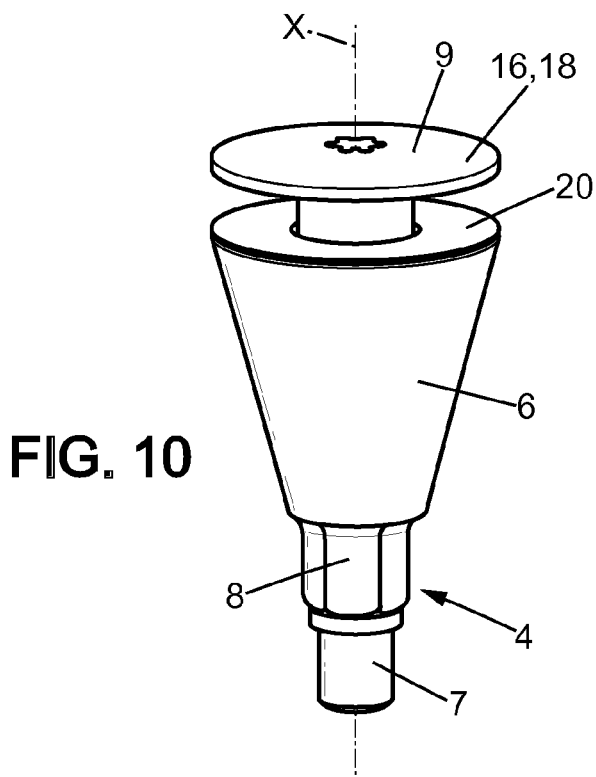
FIG. 10 is a perspective view of the assembly of FIG. 6, wherein the first and second parts have been removed.

The flange 16 may rest on the first part 2, either directly or indirectly, for example via a washer 23 (FIG. 3).

In the untightened state of the bolt 4, the angle α between the bearing surface 17 of the flange 16 with respect to the complementary bearing surface 13 of the first part 2 is comprised between 0.1 and 6°.

In the tightened state of bolt 4, this angle α may be zero so that the entire bearing surface 17 of the flange 16 bears on the complementary bearing surface 13 of the first part 2. The flange 16 is tapered in the direction of its outer periphery.

Moreover, a recessed annular groove 17a extends at the inner periphery of the bearing surface 17, so as to facilitate the deformation of the flange 16.

The groove 17a may include a section at least one portion of which has a circle portion shape. Said section is viewed according to a plane extending according to the axis X of the flange 16, which is coincident with the axis of the screw 7, of the nut 8, of the bushing 5 and of the spacer 6

The radius R of the portion shaped as a circle portion may be comprised between 0.2 and 1.4 mm for example.

The surface 18 of the flange 16 opposite to the bearing surface 17 is a frustoconical surface. The head 9 of the screw 7 bears on an inner chamfer 19 of the bushing 5.

The surface 18 is inclined by an angle P with respect to a plane perpendicular to the axis of the flange. Said angle P may be comprised between 5 and 30°.

The thickness e of the flange 16 at its outer periphery may be comprised between 0.6 and 1.5 mm. The thickness is the dimension of the flange 16 along the axis X of the flange 16.

The distance d, according to the axis X of the flange 19, between the inner periphery of the bearing surface 17 and the outer periphery of the surface 18, may be comprised between 1 and 5 mm.

The spacer 6 is annular and includes a first end 20 bearing on the bottom surface of the counterbore 14 of the second part 3 and a second end 21 bearing on the nut 8.

The spacer 6 has a frustoconical shape flared in the direction of the first end 20. The outer diameter and the inner diameter of the first end 20 generally correspond to the outer and inner diameters of the flange 16.

The spacer 6 has an inner recess 22 intended to partially accommodate the cylindrical portion 15 of the bushing 5. Moreover, said cylindrical portion 15 is centered in said inner recess 22. The spacer 6 is made of a material having a higher coefficient of expansion than that of the screw 7, so as to hold clamping of the two parts 2, 3 together despite any differential expansion effects.

For example, the screw 7 is made of a material of the Inconel 718 or Waspaloy type (registered trademarks). For example, the spacer 6 is made of an A286-type material.

FIGS. 6 to 10 illustrate an assembly according to another embodiment of the invention, which differs from the embodiment illustrated in FIGS. 1 to 5 in that the assembly has no bushing 5, the flange 16 being formed by the head 9 of the screw 7. The screw 7 is centered in the spacer 6, at the end 20 of said spacer 6. Also in this embodiment, washers 23 may be mounted between the flange 16 and the first part 2, on the one hand, and between the spacer 6 and the second part 3, on the other hand.

Moreover, the assembly 1 has no distinct nut 8, the nut 8 being herein formed by the corresponding end 21 of the spacer 6.

The invention claimed is:

1. An assembly (1) for a turbine engine, said assembly (1) comprising:
   at least a first part (2) and a second part (3), and
   at least one bolt (4) including a screw (7) cooperating with a nut (8), said screw (7) extending throughout an orifice (11) of the first part (2) and an orifice (12) of the second part (3), the bolt (4) further including:
      a bearing member comprising an annular flange (16) mounted between the screw (7) or the nut (8), on the one hand, and the first part (2), on the other hand, said flange (16) including a bearing surface (17) bearing, at least partially, on a complementary bearing surface (13) of the first part (2), characterized in that said bearing surface (17) of the flange (16) is frustoconical and forms an angle (a) with the complementary bearing surface (13) of the first part (2) so that only an outer peripheral area of said bearing surface (17) of the flange (16) comes into contact with the complementary bearing surface (13) of the first part (2), in an untightened state of the bolt (4), said flange (16) being deformable so that, when tightening said nut (8) on the screw (7), a larger area of the bearing surface (17) of the flange (16) bears on the complementary bearing surface (13) of the first part (2), said bearing member including a recessed annular groove extending at an inner periphery of the flange, the flange (16) being tapered in the direction of an outer periphery of the flange (16).

2. The assembly (1) according to claim 1, characterized in that the groove includes a section at least one portion of which has a circle portion shape.

3. The assembly (1) according to claim 2, characterized in that the radius of the at least one portion having a circle portion shape is comprised between 0.2 and 1.4 mm.

4. The assembly (1) according to claim 2, characterized in that, in the untightened state of the bolt (4), the angle (a) between the bearing surface (17) of the flange (16) with respect to the complementary bearing surface (13) of the first part (2) is comprised between 0.1 and 6°.

5. The assembly (1) according to claim 1, characterized in that, in the untightened state of the bolt (4), the angle (a) between the bearing surface (17) of the flange (16) with respect to the complementary bearing surface (13) of the first part (2) is comprised between 0.1 and 6°.

6. The assembly (1) according to claim 1, characterized in that the first part (2) is made of a composite matrix ceramic material.

7. The assembly (1) according to claim 1, characterized in that it includes a spacer (6) mounted between the second part (3) and a portion of the bolt (4), said spacer (6) being made of a material having a higher coefficient of expansion than that of the screw (7).

8. The assembly (1) according to claim 7, characterized in that the spacer (6) includes one end (20) bearing on the second part (3) and one end (21) bearing on the nut (8) or on a portion of the screw (7).

9. The assembly (1) according to claim 1, characterized in that it includes a bushing (5), said bushing (5) comprising a cylindrical portion (15) surrounding the screw (7) and accommodated at least partially in the orifices (11, 12) of the first and second parts (3), said flange (16) being formed by the bushing (5) and extending from one end of the cylindrical portion (15).

10. The assembly (1) according to claim 1, characterized in that the flange (16) is formed at one end of the screw (7).

11. The assembly (1) according to claim 1, characterized in that the flange (16) is accommodated, at least partially, in a counterbore (13) of the first part (2).

12. An assembly (1) for a turbine engine, said assembly (1) comprising:
    at least a first part (2) and a second part (3), and
    at least one bolt (4) including a screw (7) cooperating with a nut (8), said screw (7) extending throughout an orifice (11) of the first part (2) and an orifice (12) of the second part (3), the bolt (4) further including:
    a bearing member comprising an annular flange (16) mounted between the screw (7) or the nut (8), on the one hand, and the first part (2), on the other hand, said flange (16) including a bearing surface (17) bearing, at least partially, on a complementary bearing surface (13) of the first part (2), characterized in that said bearing surface (17) of the flange (16) is frustoconical and forms an angle (a) with the complementary bearing surface (13) of the first part (2) so that only an outer peripheral area of said bearing surface (17) of the flange (16) comes into contact with the complementary bearing surface (13) of the first part (2), in an untightened state of the bolt (4), said flange (16) being deformable so that, when tightening said nut (8) on the screw (7), a larger area of the bearing surface (17) of the flange (16) bears on the complementary bearing surface (13) of the first part (2), said bearing member including a recessed annular groove extending at the inner periphery of the flange, and
    a spacer (6) mounted between the second part (3) and a portion of the bolt (4), said spacer (6) being made of a material having a higher coefficient of expansion than that of the screw (7), the spacer (6) including one end (20) bearing on the second part (3) and one end (21) bearing on the nut (8) or on a portion of the screw (7), the spacer (6) having a frustoconical shape flared in the direction of the end (20) bearing on the second part (3).

13. The assembly (1) according to claim 12, wherein an outer diameter and an inner diameters of the end (20) bearing on the second part (3) correspond to an outer diameter and an inner diameter of the flange (16).

14. The assembly (1) according to claim 12, wherein the assembly (1) includes a bushing (5), said bushing (5) comprising a cylindrical portion (15) surrounding the screw (7) and accommodated at least partially in the orifices (11, 12) of the first and second parts (3), said flange (16) being formed by the bushing (5) and extending from one end of the cylindrical portion (15), a head (9) of the screw (7) bearing on an inner chamfer (19) of the bushing (5).

* * * * *